Oct. 4, 1966    J. H. WHITFIELD    3,276,515
GAS TURBINE REGENERATOR

Filed April 9, 1964    2 Sheets-Sheet 1

INVENTOR.
James H. Whitfield
BY Harness & Harris
ATTORNEYS

Oct. 4, 1966  J. H. WHITFIELD  3,276,515

GAS TURBINE REGENERATOR

Filed April 9, 1964  2 Sheets-Sheet 2

INVENTOR.
James H. Whitfield.
BY
ATTORNEYS.

3,276,515
GAS TURBINE REGENERATOR
James H. Whitfield, Madison Heights, Mich., assignor to Chrysler Corporation, Highland Park, Mich., a corporation of Delaware
Filed Apr. 9, 1964, Ser. No. 358,544
9 Claims. (Cl. 165—10)

This invention relates to improvements in the construction of a rotary disc-type regenerator for an automotive gas turbine engine.

One common disc-type regenerator comprises a core or matrix having a multitude of parallel axially extending gas passages arranged about a central hub or axis of rotation and confined within a peripheral rim. The axially opposite ends of the gas passages are arranged in parallel planes perpendicular to the axis of rotation and comprising end faces of the matrix through which two oppositely directed streams of gases at different temperatures and pressures are conducted. For example, a sector shaped seal in sliding and sealing contact with each of the opposite end faces of the regenerator matrix partitions the latter into two sectors. Comparatively cool high pressure inlet air is directed toward one end face of the matrix at one sector thereof, thence through that sector to be preheated by the hot regenerator matrix. The preheated air is then directed to a combustion chamber where fuel is added and burned, the hot combustion products being then directed through the turbine stages of the engine to drive the turbine rotors.

The comparatively hot low pressure exhaust gases from the rotors are then directed through the other sector of the regenerator matrix in the direction axially opposite to the inlet air flow, whereby the latter regenerator matrix is heated. Rotation of the regenerator carries its heated sector continuously to the region of the first mentioned sector to receive the comparatively cool gas flow to preheat the inlet gas as aforesaid, and thereby to cool the regenerator.

Such a regenerator is commonly known as a counter-flow regenerator and is feasible for use in automotive gas turbine engines. Among the requirements for such a regenerator, overall compactness is of a very high order. Compactness is achieved in part by forming the regenerator matrix with a multitude of tiny thin-walled gas passages. As the side wall thickness of the individual gas passages decreases, the overall structural rigidity of the regenerator also decreases. Furthermore, the thin side walls are subject to large stress from comparatively small loads distributed from thermal and pressure differences and mechanical forces. Rotation of the regenerator in addition causes cycling of the loads which aggravates the tendency of the thin gas passage walls to fail by fatigue.

In consequence it has been a commonplace to provide the regenerator with a plurality of radial spokes connecting the central hub to the peripheral rim and reinforcing the regenerator matrix, as indicated by a long established line of art represented by numerous patents, such as: Ljungstrom, Patent No. 1,762,446; Boestad, Patent No. 2,229,691; Gates, Patent No. 2,438,851; Karlsson, Patent No. 2,680,008; Mudersbach, Patent No. 2,852,234; and Bubniak, Patent No. 2,893,699. Such spokes, however, interfere with the manufacture of the regenerator structure, add appreciably to its weight, decrease its useable gas flow area and efficiency, and increase its overall size and cost.

An important object of the present invention is to provide an improved construction in a gas turbine engine regenerator core or matrix of the above general character which is self-supporting without recourse to supplemental radial reinforcing spokes or to a reinforced rim.

As explained more fully in the copending application of Huebner, Serial No. 204,462, filed June 22, 1962, the most effective heat transfer passage is the thin-walled straight tube of long and narrow cross sectional shape. Attempts have been made heretofore to fabricate such a regenerator matrix from thin corrugated stock wound spirally or concentrically around the central hub. The juxtaposed convolutions of the corrugated stock were bonded to each other to complete a plurality of elongated axially extending gas passages. However, the unusual and comparatively large forces acting on the thin walls of the gas passages caused rupturing of the core and consequence leakage and inefficient operation of the regenerator.

It is accordingly another object to provide an improved regenerator construction of the foregoing character which optimizes the use of the long narrow gas flow passages and adapts the same as the sole structural support for the matrix.

A more specific object is to provide such a regenerator in combination with a diametric seal across opposite end faces of the regenerator matrix, the matrix comprising a number of axially extending layers of flat stock arranged either spirally or concentrically around a central hub and spaced radially by strips of corrugated stock. The corrugated stock comprises continuous circumferentially spaced convolutions each having a generally radially extending long side bonded or brazed at its ends to the flat stock, opposite ends of each long side of the convolutions being spaced from one of each of the next circumferentially adjacent long sides by generally circumferentially extending short ends of the convolutions.

The radially extending long sides of the convolutions supported at their ends by the flat strips serve as numerous tensile and compressive members somewhat in the manner of discontinuous spokes extending from the central hub to the peripheral rim to carry the various forces acting on the matrix and to hold the hub and rim in proper relationship and to give the matrix its necessary rigidity without recourse to supplemental reinforcing spokes.

The radially elongated gas passages arranged side by side locate a number of passages across the seal in the direction of the pressure gradient. Thus the pressure differential from one passage to the next and the resulting stress in the long passage side walls of the convolutions is minimized. Discontinuous pressure gradients along the seal resulting from defective sealing or splits in the matrix will be carried across the short strong ends of the convolutions. Essentially, then, the configuration allows small pressure differences across the long weak sides of the convolutions and higher pressure differences, resulting from possible defects and the configuration of the seal, across the stronger short ends of the convolutions.

Other objects of this invention will appear in the following description and appended claims, reference being had to the accompanying drawings forming a part of this specification wherein like reference characters designate corresponding parts in the several views.

Figures 1, 2, 3:
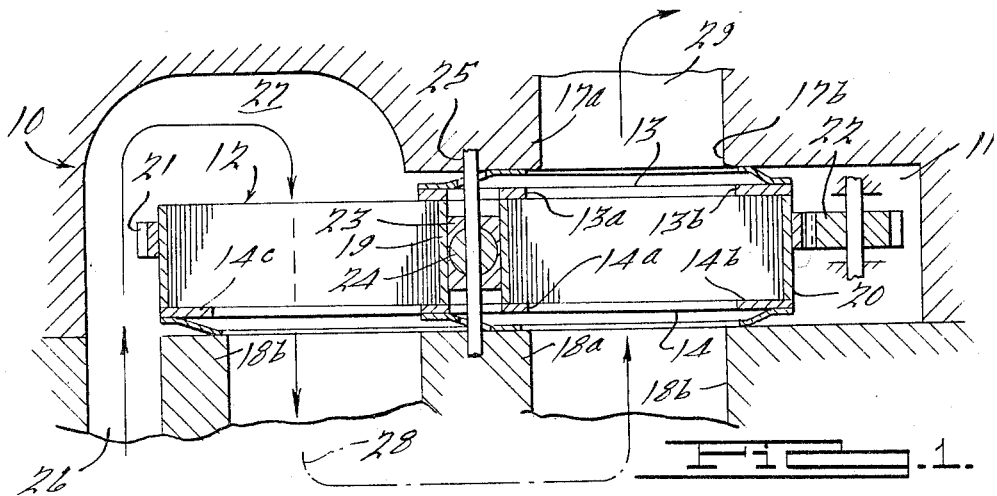
FIGURE 1 is a fragmentary schematic mid-sectional view through the axis of rotation of the regenerator of a gas turbine engine embodying the present invention.
FIGURE 2 is a plan view showing the regenerator and sector seal, with the engine housing removed.
FIGURE 3 is a fragmentary enlarged plan view of a portion of the matrix illustrated in FIGURE 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a specific embodiment of the present invention is illustrated by way of example in a gas turbine engine for an automobile vehicle, the engine being shown schematically as a housing 10 having a regenerator chamber 11 containing a rotary counterflow disc-type regenerator 12. Upper and lower seals 13 and 14 between the upper and lower end faces respectively of the regenerator and supporting portions of the housing 10 partition the area of the regenerator into a high pressure sector 15 and a low pressure sector 16.

Inasmuch as the specific seals employed are not critical to the present invention, the seals are illustrated schematically. A particular seal suitable for use with the present invention is described in detail in the copending application of Chapman et al., Serial No. 314,318, filed October 7, 1963.

Basically the seal 13 comprises a diametrically extending cross arm portion 13a and a semi-circular peripheral portion 13b which complete a D-shaped assembly extending entirely around the low pressure sector 16. A D-shaped supporting portion of the housing 10, co-extensive with the D-shaped seal 13 immediately overlies the latter and comprises a diametrical or cross arm portion 17a and a semi-circular peripheral portion 17b. Similarly the seal 14 includes a cross arm portion 14a which cooperates with a semi-circular peripheral portion 14b to enclose the low pressure sector 16, and which cooperates with a semi-circular peripheral portion 14c to enclose the high pressure sector 15. The fixed support of housing 10 for seal 14 and coextensive therewith comprises a cross arm supporting portion 18a underlying the seal portions 14a, and an annular supporting portion 18b underlying the peripheral seal portions 14b and 14c.

In the present instance the upper seal 13 includes an inner rubbing seal portion in sliding and sealing engagement with the juxtaposed upper end face of the matrix of regenerator 12. A flexible diaphragm completes the seal between the inner rubbing portion of seal 13 and supports 17a, 17b. Similarly the seal 14 includes an inner rubbing seal portion in sliding and sealing engagement with the juxtaposed lower end face of the regenerator matrix. A flexible diaphragm completes the seal between the inner rubbing portion of seal 14 and the supports 18a, 18b. Thus the seals isolate the sectors 15 and 16 from each other and separate the high pressure gases from the low pressure gases to enable an efficient flow path as described below.

The regenerator 12 comprises a central hub 19 and an annular rim 20 which carries a coaxial annular ring gear 21 meshed with a power-driven pinion 22. The hub 19 in the present instance is tubular and carries a coaxial spherical socket element 23 enclosing a spherical bearing 24 so as to complete a ball and socket type universal mounting. The sphere 24 has a diametrical bore through which extends a fixed axle shaft 25 having its opposite ends secured within the supports 17a and 18a. The central bore of the sphere 24 is in sliding and bearing engagement with the axle 25 so that the regenerator 12 is freely floating axially and freely pivotal universally with respect to the axis of axle 25, the regenerator being supported axially primarily by the resiliency of the seal and the pressure differential of the gases being sealed as described in the aforesaid Chapman et al. application.

Comparatively cool high pressure inlet air or gas is supplied from a suitable compressor via an inlet duct 26 into chamber 11 and a high pressure inlet header 27 overlying the regenerator sector 15. The inlet gases in a typical automotive engine enter at approximately 60 p.s.i.a. and at approximately 400° F. The inlet gases pass from header 27 axially downwardly in FIGURE 1 through a multitude of small parallel axially extending gas flow passages comprising the matrix of regenerator 12, whereby the inlet gases are preheated to approximately 1100° F. by the hot regenerator matrix. Thereafter the preheated inlet air follows a flow path indicated schematically by the numeral 28 through a combustion chamber where fuel is added and burned, and thence through the turbine rotor stages to drive the turbine rotors. The gases are exhausted from the turbine rotors at approximately 15 p.s.i.a. (atmospheric) and 1200° F. and are conducted upwardly in FIGURE 1 through sector 16 to exhaust chamber 29. During the upward passage of the hot exhaust gases, the regenerator matrix is heated and the exhaust gases are cooled to approximately 500° F. whereupon the cool gases are exhausted to the atmosphere. The rotating regenerator continuously carries the heated portions from the region of sector 16 to the region of sector 15 to preheat the inlet gases and to cool the regenerator.

It is apparent from the structure shown that the regenerator is subject to numerous forces during operation including a major pressure internal force exerted generally from left to right in consequence of the pressure differential across the seal, a circumferentially directed frictional force resulting from the frictional drag of the seals 13 and 14 in rubbing contact with rotating end faces of the regenerator and having its resultant exerted generally parallel to the cross arm portion of the seal, a driving force applied to the regenerator rim 20 by pinion 22, and variously directed thermally induced forces resulting from temperature gradients in the regenerator. These forces reacting through the hub 19 and rim 20 are all carried by the regenerator matrix, and because of the cyclic nature of these forces resulting from the regenerator rotation, are exceptionally effective in causing fatigue and consequent rupturing of the matrix. It has been found that the desired elongated shape and the optimum wall thickness for the individual axially extending gas passages of the matrix can be preserved by suitably arranging these passages as described below.

Referring to FIGURE 3 a significant aspect of the invention is the structure of the matrix of regenerator 12 comprising thin strips of flat stock 31 arranged either concentrically or spirally around the hub 19 and spaced radially by corrugated strip stock 30. The separate convolutions of the strip 30 comprise generally radially extending long sides 30a joined at alternately opposite ends by means of short curved ends 30b. The crest of each short end 30b engages the flat strip stock 30 tangentially and is secured thereto, as by brazing at 32. The curvature of each short end is comparatively shallow and is determined with respect to the brazing material in order to draw the latter in its molten state closely into the generally triangular spaces between the ends 30b and strip material 31 by capillary action and form closed axially extending passages.

In the present instance, the latter are approximately .02″ wide between juxtaposed sides 30a and approximately .12 inch long in the radial dimension. The strip material 30 and 31 comprises stainless steel on the order of approximately two thousandths of an inch thick and extends axially the entire axial length of the regenerator 12 between its parallel upper and lower end faces. The latter are in sliding contact with the seals 13 and 14. Because of the multitude of tiny gas passages, a comparatively smooth but foraminous contact surface for the rubbing portions of the seals 13 and 14 is provided. The brazing material 32 comprises a copper alloy. However, the advantages of the present invention are not confined to the use of copper brazed stainless steel sheet material. Other sheet matrix material similarly fused or bonded to provide the configuration illustrated in FIGURE 3, such as heat resistant ceramic or glass, can be employed.

The short ends 30b reinforced by the flat strip material 31 and the brazing material 32 serve as short beams interconnecting the ends of the long sides or spoke portions 30a to effect a multitude of thin spokes extending from hub 19 to the rim 20. By virtue of the stubby character of the beams 30b, the fact that the individual elements 30a of the radial spokes are discontinuous and slightly offset circumferentially from each other is rendered immaterial when the spoke elements 30a are subject to radial forces.

The above is true because of the small leverage effective to cause deformation of the beam portions 30b connecting the radial spoke portions 30a in FIGURE 3. Thus, even in extreme cases where the long sides 30a of one convoluted layer intersect the mid-regions of the short sides 30b of the next radial adjacent layer, as in the upper portion of FIGURE 3, the tension or compressional forces are transmitted radially from the long side 30a of each convoluted layer to the long sides 30a of the next layer without distorting the matrix. In consequence supplemental reinforcing spokes, which are not efficient heat transfer element, and a reinforced rim capable by itself of withstanding the forces acting on the regenerator, are rendered unnecessary.

The ability of the regenerator to withstand deformation as a result of radial loads transmitted along the long sides 30a can be more readily appreciated when it is understood that the .02″ spacing between a pair of circumferentially adjacent long sides 30a is so slight that at a radial distance of $r_1$ of five inches from the regenerator axis of rotation, the angle $\theta$ subtended by the pair of circumferentially adjacent long sides 30a will be .02″/5″=.004 radians. As aforesaid, these circumferentially adjacent long sides 30a extend radially, so that their deviation from true parallelism will be measured by the equation:

(1) $$\theta(r_2-r_1)$$

wherein $\theta$ is the angle between circumferentially adjacent long sides 30a, and $r_1$ and $r_2$ are the radial distances from the axis of rotation to the radially inner and radially outer ends of the long sides 30a being compared. Substituting the value calculated for $\theta$=.004 in Equation 1 where $r_1$=5″ and $r_2$=5.12″, because the radial length of the long sides 30a are on the order of .12 as aforesaid, we have:

(2) $$.004(5.12″-5″)=.00048″$$

This deviation of less than five ten-thousandths of an inch from true parallelism cannot be detected by the eye alone and is appreciably less than the thickness of .002″ for the thin sheet stock 30 and 31, and is in fact appreciably less than can be obtained with normal production tolerances. Hence, for all practical purposes the circumferentially adjacent radial long sides 30a are so close together that they may be considered to be parallel to each other. In consequence the maximum circumferential offset of one long side 30a from the radially adjacent long side 30a, connected by the comparatively stubby and rigid triple thickness beam 30b, 31, 32, will be negligible and at maximum, will be not greater than one-sixth the radial spacing between successive spirals of the layer 31.

Figure 7:
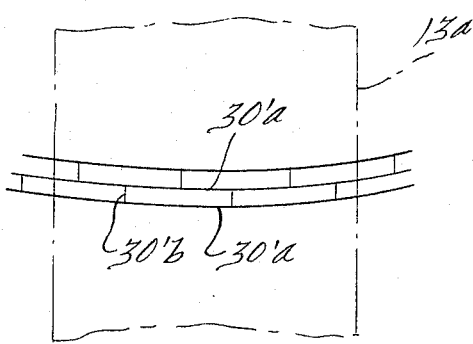
FIGURE 7 is a view similar to FIGURE 5, but showing the cross sectional elongation of the gas passages extending circumferentially.

By way of comparison if the elongation of the gas passages is aligned as in FIGURE 7 at right angles to the arrangement shown in FIGURE 3, so that the short ends 30′b would extend radially and the long sides 30′a would extend circumferentially, then if the short ends 30′b of one convoluted layer should intersect the mid-regions of the long sides 30′a of the next radially adjacent layer, the long sides 30′a thus intersected would be deformed comparatively easily.

The long sides 30a in FIGURE 3 are primarily subject to tension loads. For this reason the rim 20 must be sufficiently rigid and resilient so that localized loads or forces tending to bend it out of round will be transferred to its circumferentially adjacent parts, somewhat in the nature of a bicycle rim. However, the long sides 30a also must withstand limited compressional loads, so that in the present instance their length as compared to the length of the short end 30b is approximately in the ratio of 6:1. As more fully explained in the above mentioned Huebner application, the greater the ratio, the better will be the heat transfer characteristics of the heat passage. In no case would the structure illustrated have a long side to short side ratio of less than 3:1 because then the total amount of the flat strip material 31 and braze or weld material 32 would be too large in proportion to the total gas passage area, with resulting loss of compactness and heat transfer efficiency.

Figure 5:
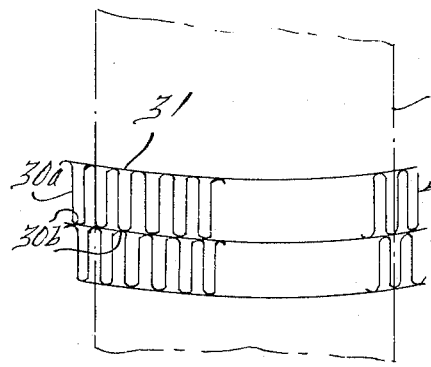
FIGURE 5 is a fragmentary enlarged plan view of the matrix under the cross arm seal, taken substantially within the circle 5 of FIGURE 2.
Figure 6:
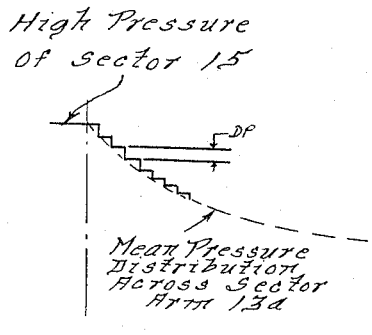
FIGURE 6 is a schematic representation of the pressure distribution across the cross arm seal of FIGURE 5.

Another advantage of the structure shown is that the pressure gradient across the cross arm portion 13a of the seal will be carried by a large number of radially elongated gas passages arranged side by side, FIGURE 5. Hence the pressure differential across the long sides of any gas passage will be comparatively small, FIGURE 6, and will not deform or rupture the gas passage.

Figure 8:
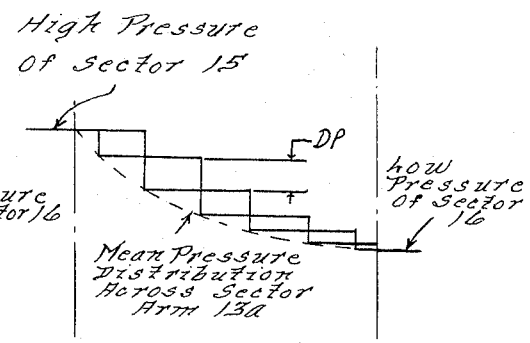
FIGURE 8 is a schematic representation of the pressure distribution across the cross arm seal of FIGURE 7.

In contrast, FIGURE 8 illustrates the pressure distribution that exists across the cross arm seal 13a when the cross sectional elongations of individual gas passages is arranged circumferentially. DP represents the pressure differential acting across the portion of the long side 30′a separating two radially adjacent gas passages, wherein the ends 30′b are not aligned radially. Where the sides 30′b are long, DP is appreciable and effective to deform the regenerator matrix.

Figure 4:
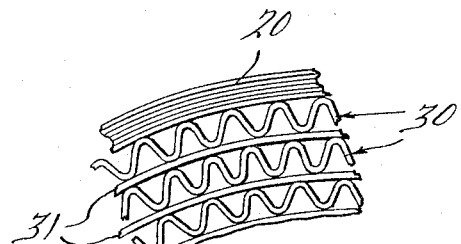
FIGURE 4 is a fragmentary enlarged plan view of the rim portion of the matrix, taken substantially within the circle 4 of FIGURE 2.

At the circumferential portions of the seal there is substantially no pressure gradient circumferentially across the long sides 30a of FIGURES 2 and 5. A comparatively large pressure differential will occur across the short ends 30b of the radially adjacent gas passages, but these short ends or beams 30b are much more resistant to deformation because of their shortness and readily carry the force of the pressure differential thereacross without being deformed. Furthermore, the circumferential portions of the matrix which underlie the seal portion 13b are not employed for heat transfer purposes and may accordingly be of triangular cross sectional shape, as illustrated in FIGURE 4. In this view the triangular convolutions of the strip 30 terminate several laps short of the strip 31, which then winds several times around the circumference of the regenerator 12 and forms the rim 20.

I claim:

1. In a rotary counter flow regenerator for a gas turbine engine, a disc-type matrix rotatable about a central axis and comprising a plurality of gas passages extending parallel to said axis and arranged side-by-side in layers extending circumferentially around said axis, said gas passages in cross section transverse to said axis being elongated radially of said axis and being defined by substantially parallel circumferentially spaced long thin sidewalls and radially spaced short end walls, the end walls of the gas passages of each layer abutting the end walls of the gas passages in the radially adjacent layers, means having a radial dimension of the order of magnitude of the thickness of said long thin sidewalls connecting the abutting end walls to comprise rigid beams for transmitting the radial forces in the long sidewalls of each layer of gas passages to the long sidewalls of the gas passages in the radially adjacent layers of gas passages, said long sidewalls being more than three times as long as the circumferential spacing therebetween and the latter spacing being not more than a few hundredths of an inch.

2. In the combination according to claim 1, said matrix comprising a plurality of radially spaced circumferentially extending layers of convoluted thin sheet stock and a spacing layer of circumferentially extending thin sheet stock spacing the radially adjacent layers of convoluted stock, the convolutions of each layer of said convoluted sheet stock comprising said long sidewalls spaced circumferentially by short end portions of said convolutions, each of the opposite ends of each long sidewall being joined to the end of one of each of the circumferentially next adjacent long sidewalls by one of said short end portions extending generally circumferentially, said ends and end portions being secured to the juxtaposed spacing layer of flat stock spacing said ends radially from the ends of the next radially adjacent layer of said convoluted sheet stock to comprise said rigid beams.

3. In a rotary disc-type counter flow regenerator for a gas turbine engine, a matrix having axially spaced end faces and comprising two side-by-side layers of thin sheet material wound spirally around the axis of rotation and extending axially the length of said regenerator between said end faces, one of said layers being convoluted in the direction of the winding and spacing consecutive windings of the other layer, the convolutions of said convoluted layer comprising generally radially extending long sides spaced by circumferentially extending short end portions adjacent said other layer, each of the opposite ends of each long side being joined to one of each of the ends of the circumferentially next adjacent long side by one of said short end portions, means comprising said short end portions of radially adjacent convolutions brazed to opposite sides of said other layer to comprise rigid beams triple the thickness of said sheet material connecting the radially adjacent long sides of said passages for transmitting the radial forces in the long sides of each spiral to the next radially adjacent long sides in juxtaposed spirals and to complete a plurality of gas flow passages of radially elongated transverse section, the circumferentially adjacent long sides being spaced by not more than a few hundredths of an inch and being sufficiently closely spaced circumferentially to extend substantially parallel to each other, such that said radially adjacent long sides connected by said rigid beams define force carrying radial spokes extending from the axial region of said matrix to its outer peripheral region, the radial dimension of each gas passage being at least three times as long as the circumferential dimension.

4. In a rotary disc-type counter flow regenerator for a gas turbine engine, a matrix having axially spaced end faces and comprising two side-by-side layers of thin sheet material wound spirally around the axis of rotation and extending axially the length of said regenerator between said end faces, one of said layers being convoluted in the direction of the winding and spacing consecutive windings of the other layer, the convolutions of said convoluted layer comprising generally radially extending long sides spaced by circumferentially extending short end portions adjacent said other layer, each of the opposite ends of each long side being joined to one of each of the ends of the circumferentially next adjacent long side by one of said short end portions, means comprising said short end portions of radially adjacent convolutions secured in overlapping reinforcing relationship to opposite sides of said other layer to comprise rigid beams connecting the radially adjacent long sides of said passages to transmit the radial forces in the long sides in juxtaposed spirals and to complete a plurality of gas flow passages of radially elongated transverse section, the radial dimension of each gas passage being at least three times longer than its circumferential dimension, the circumferentially adjacent long sides being separated by not more than a few hundredths of an inch and being sufficiently closely spaced circumferentially to extend substantially parallel to each other, such that said radially adjacent long sides connected by said rigid beams define force carrying radial spokes extending from the axial region of said matrix to its outer peripheral region.

5. In the combination according to claim 4, said long sides being sufficiently closely spaced circumferentially to comprise the sole radially extending structure carrying the radial forces in said matrix.

6. In a rotary disc-type counter flow regenerator for a gas turbine engine, a matrix having radially spaced end faces and comprising two side-by-side layers of thin sheet material wound spirally around the axis of rotation and extending axially the length of said regenerator between said end-faces, one of said layers being convoluted in the direction of the winding and spacing consecutive windings of the other layer, the radial and circumferential extent of each convolution in the several radially outermost spirals of the convoluted layer being approximately equal and the crests thereof being brazed to said other layer, said other layer extending circumferentially for several spirals beyond the radially outermost terminal of said convoluted layer to complete a rim for said regenerator, the remaining convolutions of said convoluted layer comprising generally radially extending long sides spaced by circumferentially extending short end portions adjacent said other layer, each of the opposite ends of each long side being joined to one of each of the ends of the circumferentially next adjacent long side by one of said short end portions, means comprising said short end portions of radially adjacent convolutions brazed to opposite sides of said other layer in overlapping reinforcing relationship to comprise rigid beams connecting the radially adjacent long sides of said passages to transmit the radial forces in the long sides of each spiral to the next radially adjacent long sides in juxtaposed spirals, and to complete a plurality of gas flow passages of radially elongated transverse section, said long sides being more than three times longer than said short end portions, the circumferentially adjacent long sides being sufficiently closely spaced circumferentially to extend substantially parallel to each other, such that said radially adjacent long sides connected by said rigid beams define force carrying radial spokes extending from the axial region of said matrix to its outer peripheral region.

7. In a disc-type counterflow regenerator for a gas turbine engine, a disc-type matrix rotatable about a central axis and defining a plurality of gas passages extending parallel to said axis and arranged side-by-side in layers extending circumferentially around said axis, said gas passages in cross section transverse to said axis being elongated radially and being defined in part by substantially parallel circumferentially spaced radially extending long thin sidewalls, and means having a radial dimension of the order of magnitude of the thickness of said long thin sidewalls and rigidly connecting the ends of radially adjacent long sidewalls for transmitting the radial forces in the long sidewalls of each layer of gas passages to the long sidewalls of the gas passages in the radially adjacent layers of said gas passages and cooperating with said long sidewalls and connecting the circumferentially adjacent ends thereof to completely define said gas passages, the circumferential spacing between circumferentially adjacent long sidewalls in radially adjacent layers being of the same order of magnitude and sufficiently small that said circumferentially adjacent long sidewalls are substantially parallel to each other and such that said radially adjacent long sidewalls connected by said beams define force carrying spokes extending substantially radially from the axial region to the outer peripheral region of said matrix, the radial dimension of each gas passage being at least three times as long as the circumferential dimension and the latter being not more than a few hundredths of an inch.

8. In a rotary disc-type counterflow regenerator for a gas turbine engine, a disc-type matrix rotatable about a central axis and defining a plurality of gas passages extending parallel to said axis, said gas passages in cross section transverse to said axis being elongated radially and being defined by substantially radially extending long thin sidewalls spaced circumferentially by short end walls, the radial dimensions of said long sidewalls being not less than three times greater than the circumferential dimensions of said short end walls, the circumferential spacing between the long sidewalls of radially adjacent gas passages being of the same order of magnitude and being sufficiently small that said sidewalls of each gas passage are substantially parallel to each other, such that each long sidewall is substantially in radial alignment with a radially adjacent long sidewall and the circumferential offset of each sidewall from its substantially radially aligned long sidewall is not greater than one-sixth the radial dimension of that long sidewall, means having a radial dimension of the order of magnitude of the thickness of said long thin sidewalls for rigidly connecting the substantially radially aligned long sidewalls to comprise force carrying radial spokes extending from the axial region of said matrix to its outer peripheral region, the long sidewalls of each gas passage being separated by not more than a few hundredths of an inch.

9. In the combination according to claim 8, the long sidewalls of each gas passage being sufficiently closely spaced circumferentially to comprise the sole radial means for carrying radial forces in said matrix from its axial region to its outer peripheral region.

UNITED STATES PATENTS
References Cited by the Examiner

| | | | |
|---|---|---|---|
| Re. 19,140 | 4/1934 | Frankl | 165—10 |
| 1,586,816 | 1/1926 | Ljungstrom | 165—7 |
| 1,762,426 | 6/1930 | Sohr et al. | 165—10 |
| 2,646,027 | 7/1953 | Ackerman et al. | 165—166 X |
| 2,657,018 | 10/1953 | Simpelaar | 165—153 XR |
| 2,792,200 | 5/1957 | Huggins et al. | |

FOREIGN PATENTS 683,282  11/1952  Great Britain.

ROBERT A. O'LEARY, *Primary Examiner.*

T. W. STREULE, *Assistant Examiner.*